US010581852B2

(12) United States Patent
Schaffner et al.

(10) Patent No.: US 10,581,852 B2
(45) Date of Patent: Mar. 3, 2020

(54) HARDWARE IMPLEMENTATION METHODS AND SYSTEM FOR SECURE, POLICY-BASED ACCESS CONTROL FOR COMPUTING DEVICES

(71) Applicant: Sequitur Labs Inc., Issaquah, WA (US)

(72) Inventors: Daniel Schaffner, Seattle, WA (US); Simon Curry, Chelmsford, MA (US); Paul Chenard, Corvallis, OR (US); Philip Attfield, Fall City, WA (US)

(73) Assignee: Sequitur Labs, Inc., Issaquah, WA (US)

( * ) Notice: Subject to any disclaimer, the term of this patent is extended or adjusted under 35 U.S.C. 154(b) by 0 days.

(21) Appl. No.: 14/710,993

(22) Filed: May 13, 2015

(65) Prior Publication Data

US 2015/0334133 A1 Nov. 19, 2015

Related U.S. Application Data

(60) Provisional application No. 61/992,960, filed on May 14, 2014.

(51) Int. Cl.
*H04L 29/06* (2006.01)
*G06F 8/41* (2018.01)
(Continued)

(52) U.S. Cl.
CPC .............. *H04L 63/10* (2013.01); *G06F 8/41* (2013.01); *G06F 17/5045* (2013.01);
(Continued)

(58) Field of Classification Search
CPC ....................................................... H04L 63/10
(Continued)

(56) References Cited

U.S. PATENT DOCUMENTS 5,881,225 A 3/1999 Worth
7,140,035 B1 11/2006 Karch
(Continued)

FOREIGN PATENT DOCUMENTS

WO PCT/US14/70897 12/2014
WO WO 2015/026389 2/2015
(Continued)

OTHER PUBLICATIONS

"Computer Architecture: A Quantitative Approach", Hennessy J. and Patterson, D., 5th Ed. Morgan Kaufman (2011).
(Continued)

*Primary Examiner* — Peter C Shaw
(74) *Attorney, Agent, or Firm* — JRG Attorneys at Law

(57) ABSTRACT

A system and method for hardware implementations of policy-based secure computing environments for Internet enabled devices. The present invention facilitates a secure computing environment for any Internet enabled device where policy rules can be described as hardware components that allow or deny access to resources on the device. A compiler produces a hardware description language (HDL) of the hardware components based on given policy rules for that component. The system may be partially or completely implemented in hardware to address inherent limitations of a software only solution. The invention provides greater flexibility to the overall system in terms of performance, security, and expressiveness of the policy rules that must be executed.

9 Claims, 4 Drawing Sheets

(51) Int. Cl.
*G06F 17/50* (2006.01)
*G06F 21/70* (2013.01)
*G06F 21/62* (2013.01)

(52) U.S. Cl.
CPC .............. *G06F 21/62* (2013.01); *G06F 21/70* (2013.01); *H04L 63/20* (2013.01)

(58) Field of Classification Search
USPC ............................................................ 726/1
See application file for complete search history.

(56) References Cited

U.S. PATENT DOCUMENTS

| | | | |
|---|---|---|---|
| 7,246,233 B2 | 7/2007 | Brabson et al. | |
| 7,640,429 B2 | 12/2009 | Huang et al. | |
| 8,127,982 B1 | 3/2012 | Casey et al. | |
| 8,224,638 B1* | 7/2012 | Shirazi | G06F 17/5027 703/16 |
| 8,285,249 B2 | 10/2012 | Baker et al. | |
| 8,463,819 B2 | 6/2013 | Shashikumar et al. | |
| 8,468,586 B2 | 6/2013 | Koottayi et al. | |
| 2002/0138814 A1 | 9/2002 | Katayama | G06F 17/5045 716/106 |
| 2006/0026548 A1* | 2/2006 | Roesner | G06F 17/5022 716/102 |
| 2007/0116228 A1* | 5/2007 | Schneider | H04M 15/06 379/211.01 |
| 2007/0150559 A1* | 6/2007 | Smith | G06F 21/74 709/220 |
| 2009/0089125 A1 | 4/2009 | Sultan | |
| 2009/0119748 A1* | 5/2009 | Yao | G06F 21/57 726/2 |
| 2009/0204785 A1 | 8/2009 | Yates, Jr. et al. | |
| 2009/0205016 A1 | 8/2009 | Milas | |
| 2010/0037311 A1* | 2/2010 | He | H04L 63/0209 726/15 |
| 2010/0250370 A1 | 9/2010 | Jones et al. | |
| 2012/0216012 A1 | 8/2012 | Vorbach et al. | |
| 2013/0029653 A1 | 1/2013 | Baker et al. | |
| 2013/0253942 A1 | 9/2013 | Liu et al. | |
| 2013/0298664 A1 | 11/2013 | Gillette, II | |
| 2014/0007222 A1* | 1/2014 | Qureshi | G06F 21/14 726/16 |
| 2014/0010371 A1* | 1/2014 | Khazan | G06F 21/602 380/278 |
| 2014/0032691 A1* | 1/2014 | Barton | H04L 41/00 709/206 |
| 2014/0115659 A1 | 4/2014 | Atffield et al. | |
| 2015/0121138 A1* | 4/2015 | Rabinovitch | G06F 11/273 714/28 |
| 2015/0281281 A1* | 10/2015 | Peterson | H04L 63/0263 726/1 |

FOREIGN PATENT DOCUMENTS

| | | |
|---|---|---|
| WO | PCT/US15/24932 | 4/2015 |
| WO | PCT/US15/27561 | 4/2015 |

OTHER PUBLICATIONS

"Computer Networks", Tanenbaum, A. Andrew and Wetherall, D., 5th Ed. Prentice Hall (2010).
"Prolog Programming: A First Course", Brna, P. (Mar. 5, 2001). Retrieved from <http://homepages.inf.ed.ac.uk/pbrna/prologbook/> on Mar. 16, 2013.
NFC Forum (2007), "Near Field Communication and the NFC Forum: The Keys to Truly Interoperable Communications" (PDF), http://www.nfc-forum.org, retrieved Oct. 30, 2012.
Landt, Jerry (2001), "Shrouds of Time: The history of RFID", AIM, Inc, pp. 5-7.
Bluetooth Special Interest Group website, "A Look at the Basics of Bluetooth Wireless Technology", http://www.bluetooth.com/Pages/Basics.aspx, retrieved Oct. 29, 2012.
See e.g. H. Schildt, C++—The Complete Reference, 2nd edition, pp. 67-70 McGraw Hill, 1995, ISBN 0-07-882123-1.
K. Ashton, That 'Internet of Things' Thing, RFID Journal Jun. 22, 2009 (available online as of Oct. 20, 2013 at http://www.rfidjournal.com/articles/view?4986).
T. White, Hadoop—The Definitive Guide, O'Reilly, 2009, ISBN 978-0-596-52197-4.
Nakamoto, Satoshi. "Bitcoin: A peer-to-peer electronic cash system." Consulted Jan. 2012 (2008): 28. Obtained from http://www.cryptovest.co.uk/resources/Bitcoin%20paper%20Original.pdf on Apr. 6, 2015.
Bitcoin, Inc., "What are multi-signature transactions?", Obtained from http://bitcoin.stackexchange.com/questions/3718/what-are-multi-signature-transactions on Apr. 6, 2015.
Verilog, http://www.verilog.com/, accessed May 12, 2014.
IEEE P1076 Working Group, http://www.eda.org/twiki/bin/view.cgi/P1076, accessed May 12, 2014.
University of British Columbia, Department of Electrical and Computer Engineering, http://www.ece.ubc.ca/~edc/379.ian99/lectures/lec13.pdf, accessed May 12, 2014.
L. Woods, Zs. Istvan, G. Alonso. Ibex (2014) "An Intelligent Storage Engine with Support for Advanced SQL Off-loading." VLDB 2014, Hangzhou, China, Sep. 2014.

* cited by examiner

HARDWARE IMPLEMENTATION METHODS AND SYSTEM FOR SECURE, POLICY-BASED ACCESS CONTROL FOR COMPUTING DEVICES

CROSS-REFERENCE TO RELATED APPLICATIONS

This application is entitled to the benefit of, and claims priority to U.S. Provisional Application 61/992,960, filed on May 14, 2014.

TECHNICAL FIELD

The present invention relates generally to Telecommunications, Digital Communication, Computer Technology, and IT Methods for Management.

BACKGROUND OF THE INVENTION

With the proliferation of Internet connected devices there exists a growing need for secure computing environments that can be customized to the unique resources available on each device that take into consideration that the device may have to operate in a wide variety of locations in many different contexts.

U.S. patent application Ser. No. 13/945,677 discloses a system for policy-based access control and management for mobile computing devices that addresses this need. That application is included by reference as if fully set forth herein. The basic system presented in that application is summarized in FIG. 1 and FIG. 2.

The system described therein provides extensive granularity of control over permitted operations, plus network, file system, and device access on handsets controlled by the system. Furthermore, the system utilizes one or more policy decision point (PDP) servers (101) Which respond to encrypted queries from handsets controlled by a given instance of the system. These PDP servers may be remote from the handset, or may even be hosted within the handset (102). The queries typically encapsulate requests for use of specific handset or network-accessible assets, and the PDP response to such a request is then received by the querying handset, with subsequent decisions made by the PDP then enforced at the Policy Enforcement Points (PEPs) on the handset (103). Note that for the purpose of brevity in the present description, we use the term "handset" largely in regard to "smartphone" devices and similar phone devices, but the invention should be considered generally applicable for the case of any computing device that might be a client in the system.

The system and methods described in U.S. patent application Ser. No. 13/945,677 refer to software implementations whereby software that implements the policy control is loaded onto the computing hardware. However, there are instances where a purely hardware implementation or a hybrid implementation is advantageous. This new configuration is the focus of the present invention.

SUMMARY OF THE INVENTION

The present invention facilitates a secure computing environment for any Internet enabled device Where policy rules can be described that allow or deny access to resources on the device. The system described herein may be partially or completely implemented in hardware to address performance and security limitations of a software only solution.

The policy decision point (PDP) servers are the adjudicating components of the system. A hardware description language (HDL) is used to define components of the PDP which will be implemented in hardware. Any hardware implementation can be used including logic gates, content addressable RAM, or similar. The system can be fully implemented in hardware that may gain performance efficiencies but would yield flexibility. Alternatively, the system can be partially implemented in hardware whereby only some components of the PDP are hardware while others remain in executable software form. This provides greater flexibility to the overall system in terms of performance, security, and expressiveness of the policy rules that must be executed.

DESCRIPTION OF THE INVENTION

The present invention is a system and set of methods for implementing in electronic hardware all or parts of a secure, high performance policy-based access and resource control system for protecting computing devices from various threats and for controlling their usage and access to information.

The policy decision point (PDP) is where the policies that pertain to the device resources are executed and adjudicated. It may be preferable or advantageous in some circumstances to implement all or some of the PDP functionality in hardware rather than in loadable executable software. Such a hardware implementation of a PDP server has advantages such as higher performance in some circumstances, minimum required computing resources and low power operation due to dedicated hardware formed or generated in a way conforming precisely to suit the required computations, suitability for deployment within certain specialized hardware, and also hardening against attack due to the difficulty or impossibility of changing the hardware-implemented logic.

The description that follows is for purpose of illustration and not limitation. Other systems, methods, features and advantages will be apparent to one with skill in the art upon examination of the following figures and detailed description. It is intended that all such additional systems, methods, features and advantages be included within this description, be within the scope of the inventive subject matter, and be protected by the accompanying claims.

Figure 1:
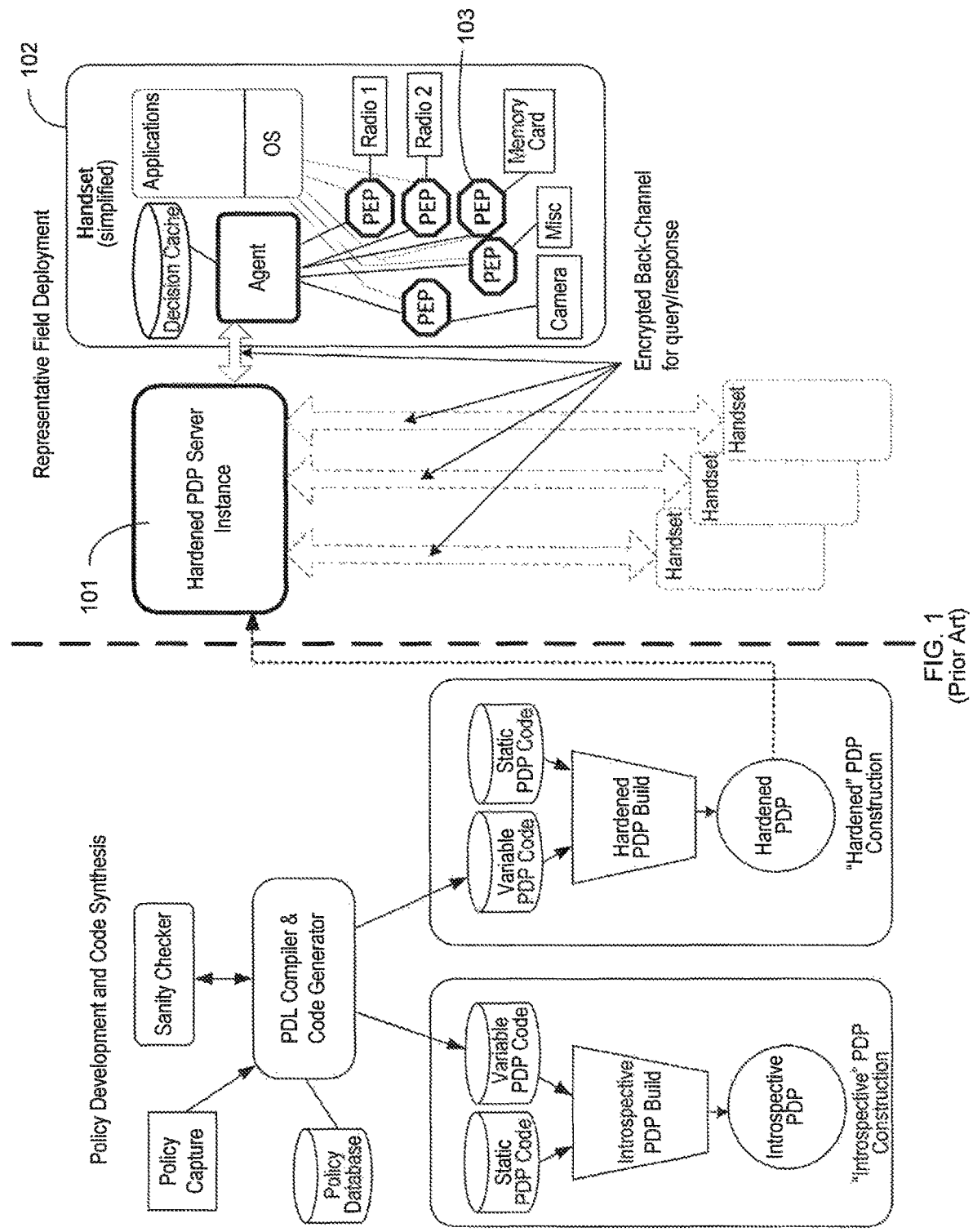
FIG. 1 is a schematic representation of one embodiment of a policy-based device access and control system. (Prior art)
Figure 2:
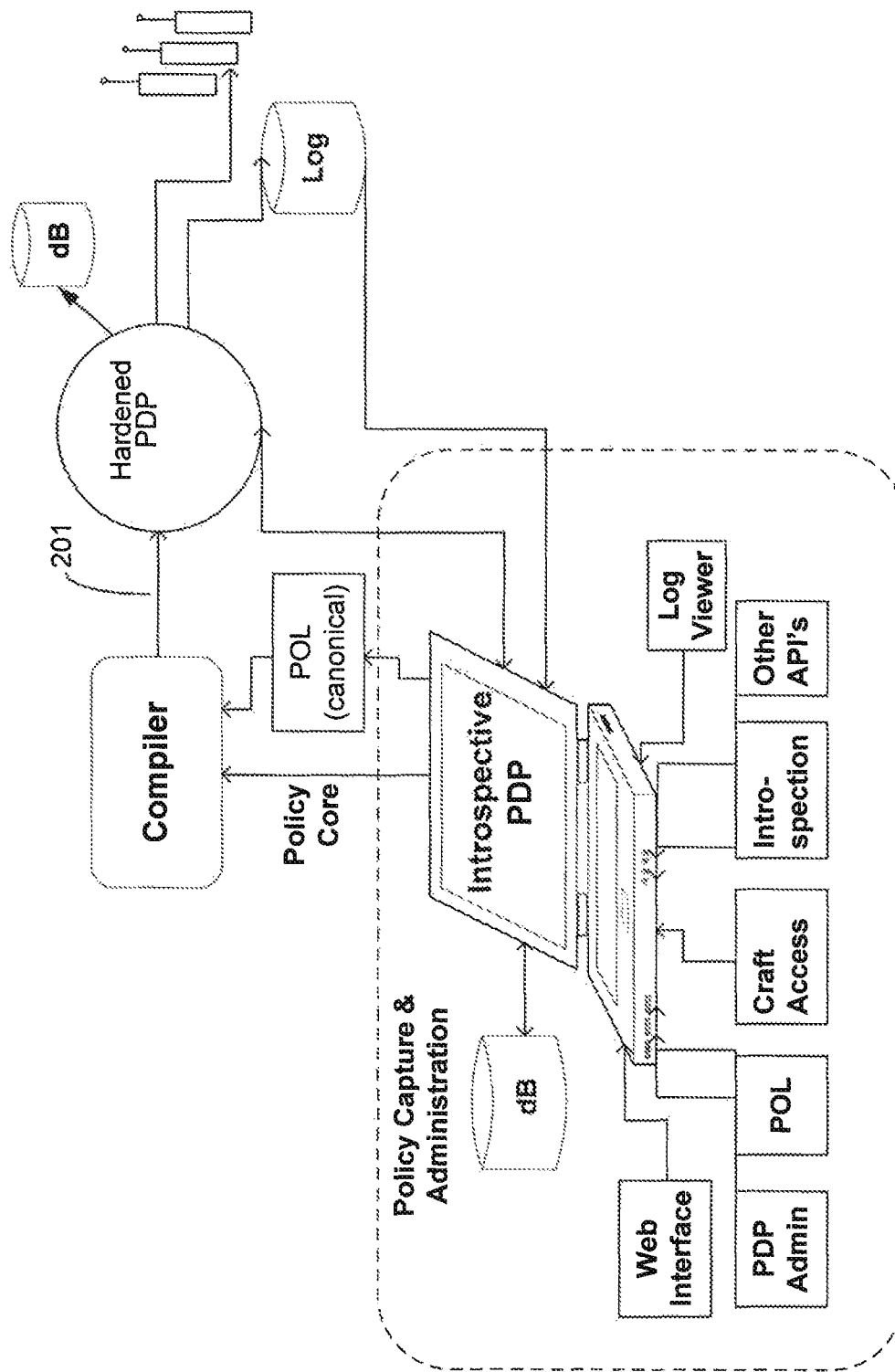
FIG. 2 is a schematic representation of one embodiment of a PDP server without specification of hardware implementation. (Prior art)
Figure 3:
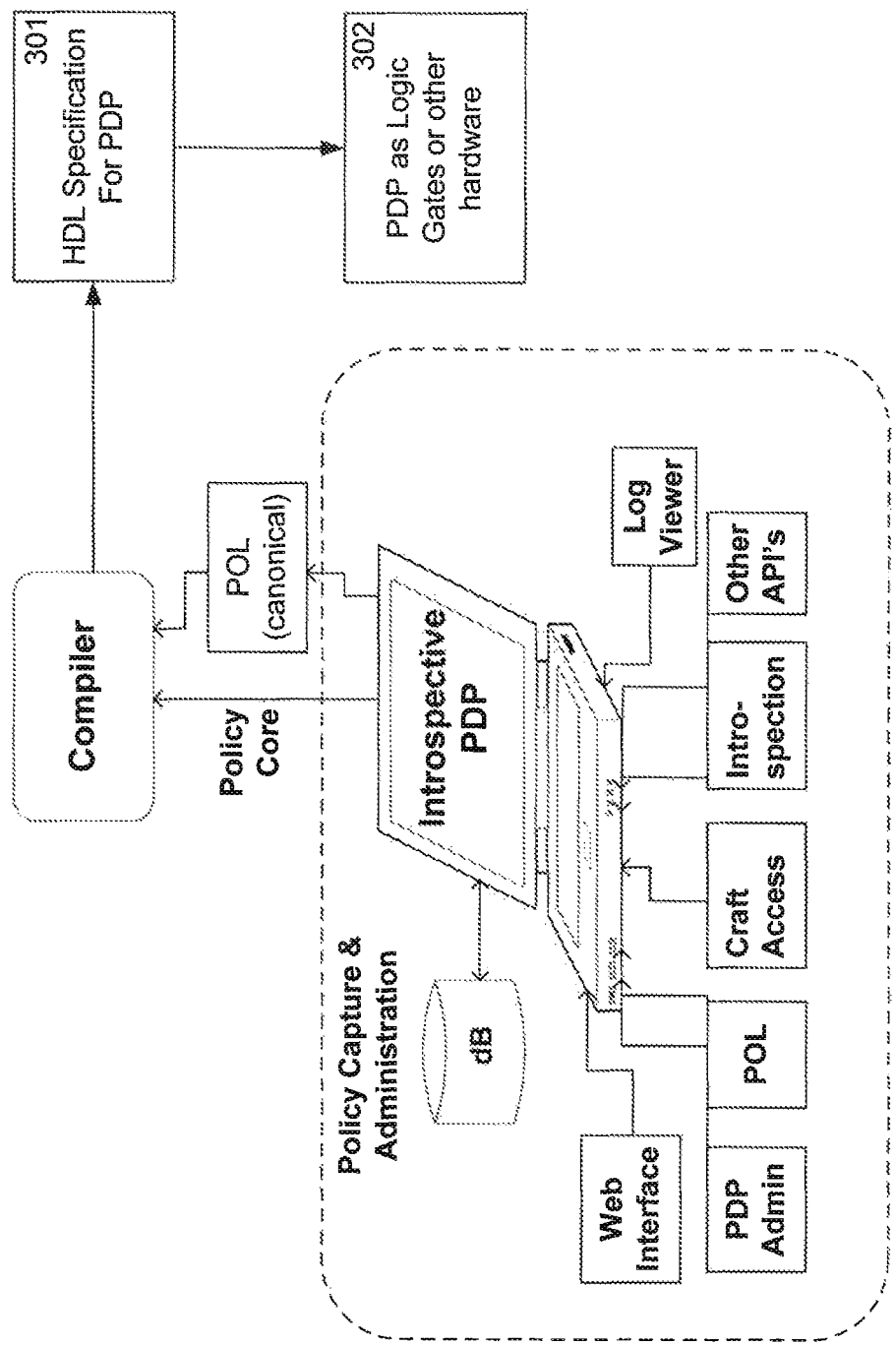
FIG. 3 is a schematic representation of one embodiment of a PDP server including hardware definition language output.

First, by way of non-limiting examples, a hardware platform suitable for such a hardware implementation of a PDP server for the system could consist of sets of logic gates, programmable logic, or could be rendered as contents of RAM or as content addressable RAM. The goal is to have the output of the compiler presented in FIG. 2 (201), or some portions of that output, be implemented in such hardware components rather than as executable software for the reasons listed previously. FIG. 3 presents schematically such a modified PDP compiler and its output.

The following steps are representative of generating such a hardware implementation.

1. Create or select a hardware architecture or platform for the PDP. As noted above, this might be some form of logic gates, or some other hardware type in which digital logic can be represented.

2. Have the compiler render the full PDP or some portion of PDP functionality in a hardware description language (HDL) (301). One non-limiting example of such an HDL is Verilog (2014). Another non-limiting example is VHDL (VHSIC (Very High Speed Integrated Circuit) Hardware Description Language) (IEEE, 2014).

3. Render or otherwise represent the HDL output of the PDP compiler in the chosen hardware form (302), or alternately, in a synthesized hardware form for purposes such as further design refinement, simulation, and testing.

In regard to steps 2 and 3, many variants on which portions of PDP functionality are implemented in hardware or in specific hardware components are possible. Furthermore, there can be both policy-dependent and policy-invariant portions of a given PDP server. A purely software implementation is highly dynamic but may suffer from performance issues as described previously. Also, because the policy itself is dynamic, it is not as secure as a static hardware implementation. Therefore, flexibility as to which components will reside in hardware and which will reside in software is the key to this invention.

For example, query-response communication aspects may be policy-invariant (i.e. static), whereas policies themselves as expressed in the POL (policy object language) language are expected to vary for different policies and policy sets. The present invention contemplates any hardware implementation of a PDP server or portions thereof.

Figure 4:
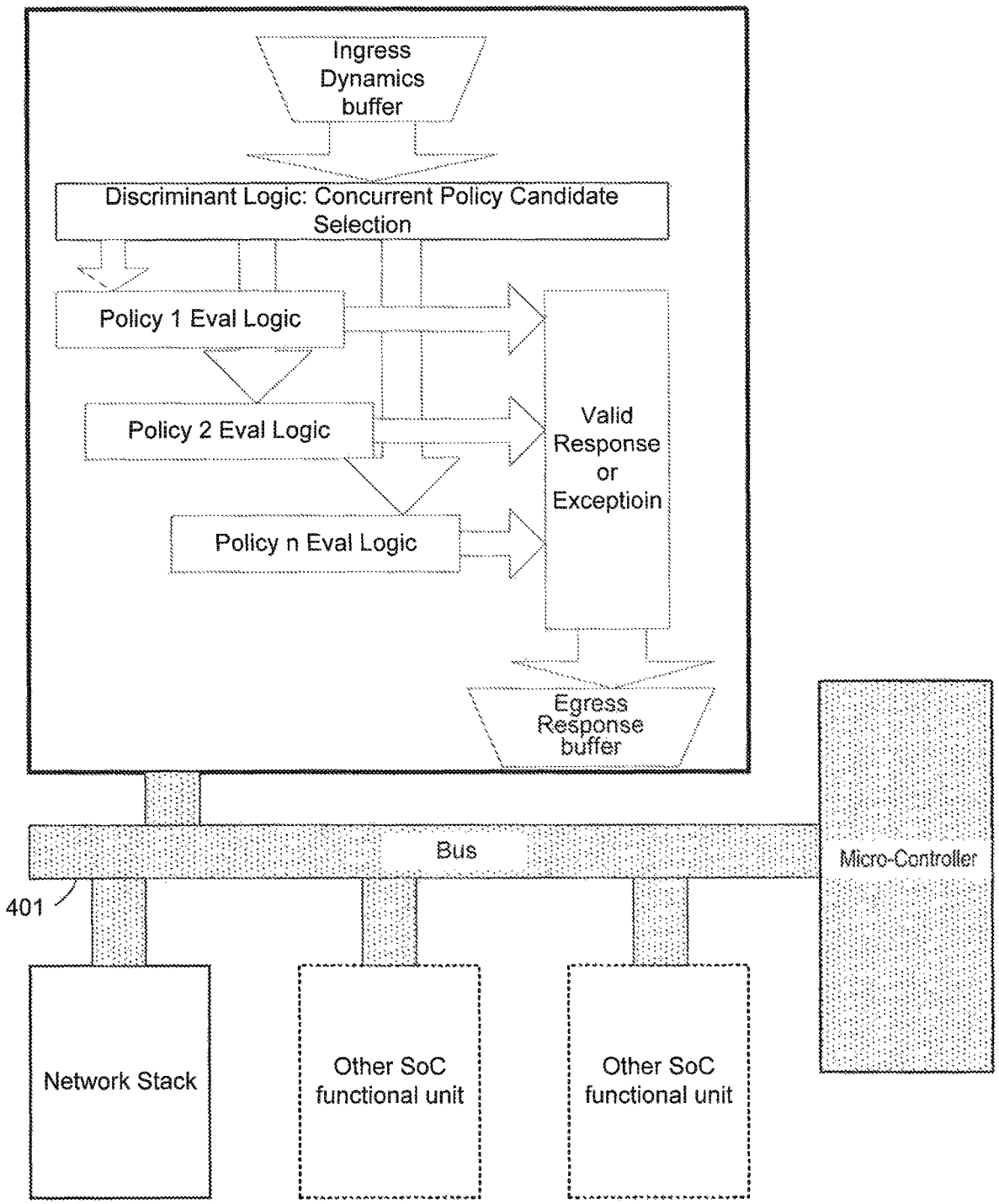
FIG. 4 is a simplified schematic representation of PDP policy-invariant hardware components and PDP policy-dependent hardware components, in one non-limiting example of a potential hardware implementation of a PDP server within a system-on-chip (SoC).

FIG. 4 is a simplified, non-limiting representation of one such implementation within one System On Chip (SoC), but many variants are contemplated within the invention, whether on a single integrated circuit, or as individual components, with any form(s) of interconnects or bus configurations. The following are some non-limiting examples of some possible implementations of the PDP itself where the degree to which the PDP is implemented in hardware varies.

1. The entire PDP server is represented in HDL and expressed as logic gates. Such a representation is relatively inflexible but may be appropriate for certain applications.

2. One or more policy-invariant portions of PDP functionality are represented in HDL and ultimately rendered as gates (see Woods et al, 2014), while other portions, such as policy dependent portions, are rendered as contents of RAM, or as Content Addressable RAM (CAM), or as some other addressable form, or even in software form. This would make for a very fast, reprogrammable, hardened hardware platform for answering policy queries.

3. Specific individual elements of PDP functionality are represented as independent hardware components, and one or more PDP servers are then assembled by connecting instances of these hardware components together. Such a modular component approach may lead to re-usability of certain components such as policy-invariant ones, and may result in hardware cost savings.

Regarding implementations 1-3 above, and other similar implementations, it is notable that any of these representations of PDP functionality or partial functionality may have significant utility and value in System-On-Chip (SoC) designs and in microprocessors. A multitude of hardware forms are possible and contemplated within the present invention, including but not restricted to Application-specific integrated circuit (ASICs), Application-specific Standard Products (ASSPs), and Field Programmable Gate Arrays (FPGAs), with the latter form allowing for some programmability and configuration after instantiation of the hardware form. Furthermore, such functional blocks could form major components of micro-controllers for use in the Internet of Things.

In regard to hardware implementations of a PDP server and related performance aspects, policies could be compiled into hardware structures that are highly efficient for candidate policy selection. Having such a policy representation, it would then be possible to perform operations such as expression evaluation that leads to the selection of the final successful policy, if any, from this candidate set, using technologies such as, but not limited to, Direct Memory Access (DMA) or Cycle Stealing.

Within the present invention, it is not required that all of the logic, whether fixed or variant, be produced by a single tool chain and compiled into hardware from that tool chain. By way of non-limiting example, policy information can be contained in RAM or other volatile or non-volatile storage. That policy information can be provided by a separate tool chain and then compiled separately into hardware.

A wide variety of interconnection methods and technologies are feasible between PDP functionality units themselves, and between instances of PDP hardware implementations and other functional components of a system. The present invention is not limited to a particular interconnect method. With PDP functionality incorporated into a system architecture, there are a wide variety of ingress/egress mechanisms that could be utilized: bus mechanisms (shown in FIG. 4 (401)) when the PDP server or components of it are close enough to the host's pins to communicate with the outside world; shared memory, and internal I/O such as interrupt mechanisms, when the PDP is an internal component of a host with no direct visibility to the host's own external I/O.

Furthermore, many system architectures are possible and contemplated here, including, but not limited to, the use of dedicated or subordinate processors specifically for PDP-specific processing or shared processing with other required computations during system operation.

INDUSTRIAL APPLICATION

The invention pertains to securing and managing network-connected computing devices and any industry where that may be of value or importance.

CITATION LIST

Verilog, http://www.verilog.com/, accessed May 12, 2014.
IEEE P1076 Working Group, http:/www.eda.org/twiki/bin/view.cgi/P1076, accessed May 12, 2014.
University of British Columbia, Department of Electrical and Computer Engineering, http://www.ece.ubc.ca/~edc/379.jan99/lectures/lec13pdf, accessed May 12, 2014.
L. Woods, Zs. Istvan, G. Alonso, Ibex (2014) "An Intelligent Storage Engine with Support for Advanced SQL Offloading." VLDB 2014, Hangzhou, China, September 2014.

What is claimed is:

1. A system for representing, assembling, and employing a hardened policy decision point (PDP) server and policy rules for adjudicating client requests to access protected resources on a protected computing device, said adjudication being completely hidden from the requesting client, the system comprising:
   an agent intercepting the client request to access a protected resource, and collecting all conditions and parameters necessary for adjudication as required by the policy rules, where said interception is hidden from the requesting client;
   an encrypted back-channel communicatively coupling the agent to the hardened PDP server communicating the client request including all conditions and parameters necessary for adjudication as required by the policy rules and hiding the policy rules, the adjudication process, and the conditions and parameters utilized by the PDP in adjudicating the client requests from the requesting client;
   a hardware selector selecting a hardware architecture of electronic and hardware components to assemble the hardened PDP server;
   a policy generator specifying policy rules and all required conditions and parameters for each rule describing allowable actions for protecting resources of the computing device, said policy generator having hardware implemented components for policy invariant portions of the hardened PDP server and executable software implemented components for policy dependent portions of the hardened PDP server and a processor for executing the software implemented components; and
   a compiler coupled to the hardware selector and to the policy generator that receives the selected hardware architecture and the policy rules and outputs a hardware architecture representation of the hardened PDP server with embedded policy rules in a hardware description language;
   whereby the hardened PDP server is assembled by connecting all electronic and hardware components in accordance with the hardware architecture representation.

2. The system of claim 1 wherein the processor is a special purpose processor exclusively to execute software components of the server.

3. The system of claim 1 wherein the processor is a shared processor.

4. The system of claim 1 wherein the hardware architecture selected by the hardware selector includes at least one of:
   logic gates;
   programmable logic;
   contents of RAM; and
   content addressable RAM.

5. The system of claim 1 wherein the encrypted back channel includes at least one of:
   bus circuit;
   shared memory; and
   interrupt circuits.

6. The system of claim 1 wherein the hardware description language (HDL) permits direct logic synthesis from the hardware description and includes Verilog and VHDL.

7. The system of claim 1 wherein the hardware architecture is expressed in the HDL and rendered in logic gates.

8. A method for representing, assembling, and employing a hardened policy decision point (PDP) server for adjudicating client requests to access protected resources on a protected computing device, said adjudication being completely hidden from the requesting client, comprising the steps of:
   selecting a hardware architecture of electronic and hardware components to assemble the hardened PDP server;
   generating a set of policy rules describing allowable actions for protecting resources of the computing device and all required conditions and parameters for each rule;
   compiling the selected hardware architecture and the policy rules and outputting a hardware architecture representation of the hardened PDP server with embedded policy rules in a hardware description language;
   implementing components for policy invariant portions of the hardened PDP server and executable software implemented components for policy dependent portions of the hardened PDP server and a processor for executing the software implemented components;
   intercepting a client request to access a protected resource using a hidden agent, wherein the interception is hidden from the requesting client;
   collecting all necessary conditions and parameters necessary for adjudication as required by the policy rules;
   connecting the hardened PDP server to the hidden agent via a hidden encrypted back-channel;
   transmitting the intercepted client request including all additional parameters needed to access the protected resource as required by the policy rules to the hardened PDP server via the hidden encrypted back-channel;
   adjudicating the client request via the hardened PDP server; and
   transmitting the adjudicated request back to said requesting client.

9. The method of claim 8 wherein connecting the hardened PDP server to the hidden agent via a hidden encrypted back channel further includes connecting a processor for executing software components of the hardened PDP server.

* * * * *